United States Patent [19]

Sasaki et al.

[11] Patent Number: 4,988,979

[45] Date of Patent: Jan. 29, 1991

[54] FAULT INSPECTION SYSTEM FOR ROTARY MACHINES

[75] Inventors: Hiroaki Sasaki, Nagoya; Yukio Fukuda; Toshio Shimizu, both of Kariya, all of Japan

[73] Assignee: Nippondenso Co., Ltd., Kariya, Japan

[21] Appl. No.: 404,736

[22] Filed: Sep. 8, 1989

[30] Foreign Application Priority Data

May 13, 1989 [JP] Japan .................................. 1-119164

[51] Int. Cl.⁵ .............................................. G08B 21/00
[52] U.S. Cl. ..................... 340/683; 73/660; 364/508
[58] Field of Search ................. 340/683, 680, 522; 73/660, 104; 364/508, 574

[56] References Cited

U.S. PATENT DOCUMENTS

| | | | |
|---|---|---|---|
| 4,010,637 | 3/1977 | Harwell et al. | 73/660 X |
| 4,089,055 | 5/1978 | Dyer et al. | 364/508 X |
| 4,253,800 | 3/1981 | Segawa et al. | 416/203 |
| 4,298,948 | 11/1981 | Davis | 73/660 X |
| 4,408,294 | 10/1983 | Imam | 364/508 |
| 4,419,897 | 12/1983 | Matsuoka | 73/660 |
| 4,471,444 | 9/1984 | Yee et al. | 73/104 X |
| 4,558,311 | 12/1985 | Forsgren et al. | 340/680 |
| 4,751,657 | 6/1988 | Imam et al. | 364/508 |
| 4,788,651 | 11/1988 | Parker et al. | 364/574 |

FOREIGN PATENT DOCUMENTS 52-129541 10/1977 Japan .
56-104246 8/1981 Japan .
59-97017 6/1984 Japan .
59-164938 9/1984 Japan .

Primary Examiner—Joseph A. Orsino
Assistant Examiner—Mullen, Jr. Thomas J.
Attorney, Agent, or Firm—Cushman, Darby & Cushman

[57] ABSTRACT

A fault inspection system for the rotary machine is disclosed in which the rotational speed or a physical quantity related thereto of the rotary machine drive with changing rotational speeds is detected as a first detection signal, and the sound pressure or mechanical vibration from the rotary machine as a second signal. A reference line representing the relationship between the values of the first and second detection signals is determined on the basis of the same values. A fault of the rotary machine is detected on the basis of a third detection signal associated with an area corresponding to the region where the first or second detection signal exceeds the reference line.

8 Claims, 9 Drawing Sheets

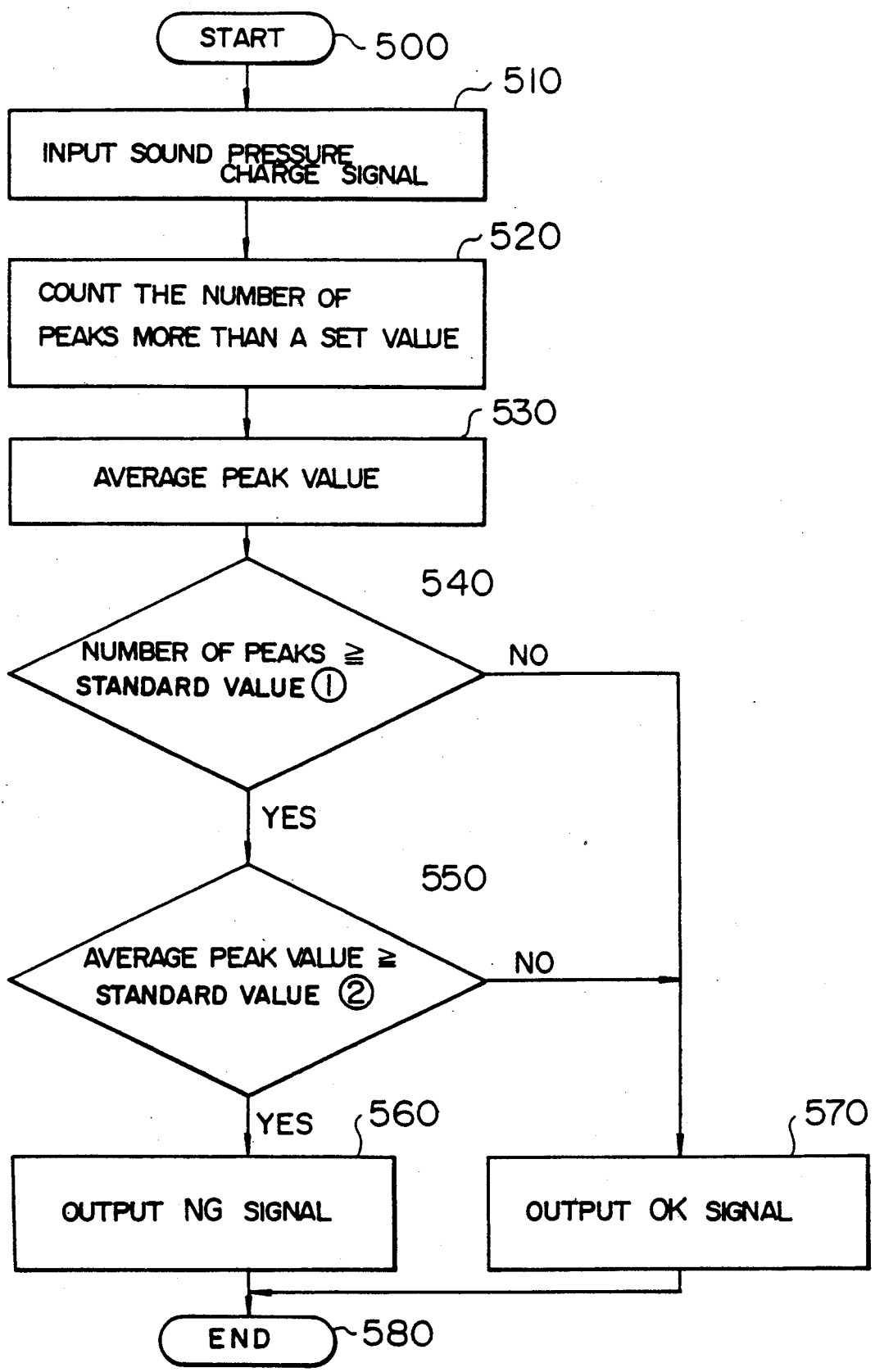

FAULT INSPECTION SYSTEM FOR ROTARY MACHINES

BACKGROUND OF THE INVENTION

The present invention relates to a fault inspection system for inspecting an abnormal noise of a vehicle generator or the like.

A conventional fault inspection system of this type has been disclosed, in which the rotational speed of a rotary machine as a product to be inspected is changed in stages for frequency analysis. On the basis of the result of the frequency analysis, a frequency component corresponding to any abnormal noise of the rotary machine is detected to inspect an abnormality of the rotary machine. (See JP-A-59-97017, for example).

In the conventional inspection systems Configured as above, in which the rotational speed is changed and fixed in multiple stages, the inspection is both complicated and time consuming. As an improvement over these conventional systems, an idea may be suggested that the rotational speed of a rotary machine is changed continuously, a frequency component corresponding to an abnormal noise which may be generated from the rotary machine is extracted by way of a filter, and the level of the abnormal noise is inspected on the basis of such factors as a peak value, an impulse value and the average value of the extracted frequency component. In view of the fact that the sound pressure level of an abnormal noise is subject to change with the rotational speed, however, the detection sensitivity against the abnormal noise of the rotary machine is not satisfactory, resulting in a low detection accuracy.

SUMMARY OF THE INVENTION

Accordingly, it is an object of the present invention to provide a fault inspection system for inspecting a fault of a rotary machine with great rapidity and accuracy.

According to the present invention, there is provided a fault inspection system capable of accurately detecting an abnormal noise in correspondence with the rotational speed of a rotary machine.

According to one aspect of the present invention, a regression line based on a first detection signal associated with the rotational speed of a rotary machine and a second detection signal associated with the sound pressure generated from the rotary machine is effectively utilized to prepare a reference line representing a desirable relation between the rotational speed and the sound pressure. Namely a fault decision area is formed to detect a fault of the rotary machine on the basis of the reference line and a predetermined relation between the values of the first and second detection signals, and a physical quantity associated with the sound pressure approximately integrated by a physical quantity associated with the rotational speed is determined in the fault decision area such as a region exceeding the reference line.

A fault, if any, of the rotary machine is decided on at least one of the results of determination of the approximate integration, thereby enabling a fault of a rotary machine to be detected with high accuracy and rapidly in accordance with the magnitude of the fault.

According to another aspect of the invention, a signal representing a sound pressure or a mechanical vibration detected from a rotary machine in inertial rotation is used to decide a fault of the rotary machine, with the result that unnecessary noises are removed and an abnormal noise which may be generated between the brush and the slip ring of the rotary machine or caused by a flaw of the bearing thereof is accurately detected.

BRIEF DESCRIPTION OF THE DRAWINGS

FIG. 9 is a flowchart showing the operation of a computation control section in FIG. 7.

DESCRIPTION OF THE PREFERRED EMBODIMENTS

Figure 1:
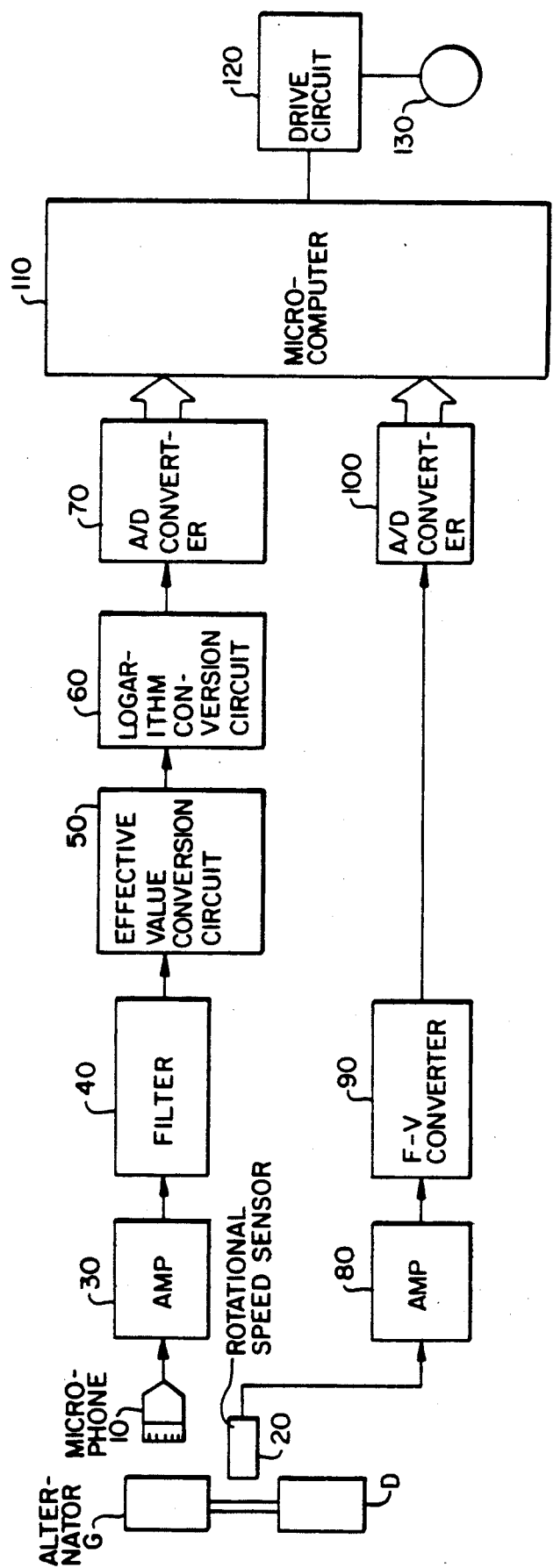
FIG. 1 is a block diagram showing an embodiment of the present invention.
Figure 3:
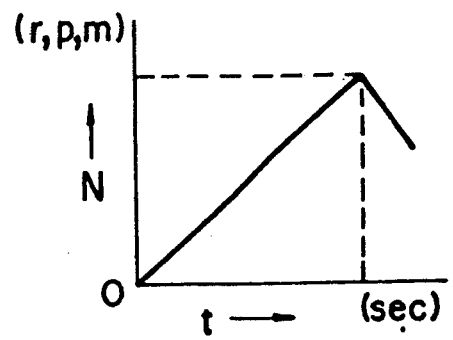
FIG. 3 is a diagram for explaining the driving conditions of an alternator.

An embodiment of the present invention will be explained with reference to the accompanying drawings. FIG. 1 shows an example of application of a fault inspection system to a vehicle alternator according to the present invention. This fault inspection system has a microphone 10 and a rotational speed sensor 20. The microphone 10 is for generating a rotational sound signal by receiving a rotational sound generated from an alternator G in rotation. The rotational speed sensor 20 is for detecting the rotational speed N of the alternator G, and generates a rotational speed signal of a frequency proportional to the result of detection of the rotational speed N. The alternator G is adapted to increase the rotational speed in gradual fashion by a drive unit D as shown in FIG. 3.

An amplifier 30 amplifies a rotational sound signal from the microphone 1 and generates an amplification signal. A filter 40 extracts a frequency component corresponding to an abnormal rotational sound of the alternator G from an amplification signal of the amplifier 30, and generates the same signal as a filter signal. The filter 40 has a bandwidth of approximately 11.2 kHz to 18 kHz in order to detect the chatter of the generator. The chatter referred to above means an abnormal noise generated by vibrations of the stator coil of the generator or the coil itself, or a loose-fixed generator cover which may cause vibrations.

An effective value conversion circuit 50 is for converting the level of a filter signal from the filter 40 into an effective value and generates an effective value signal. A logarithm conversion circuit 60 logarithmically converts the level of an effective value signal from the effective value conversion circuit 50 into a sound pressure Ls, and generates the sound pressure Ls as a sound pressure signal. An A/D converter 70 is for Converting the level of a sound pressure signal from the logarithm conversion circuit 60 into a digital value and generates a digital sound pressure signal.

Figure 2:
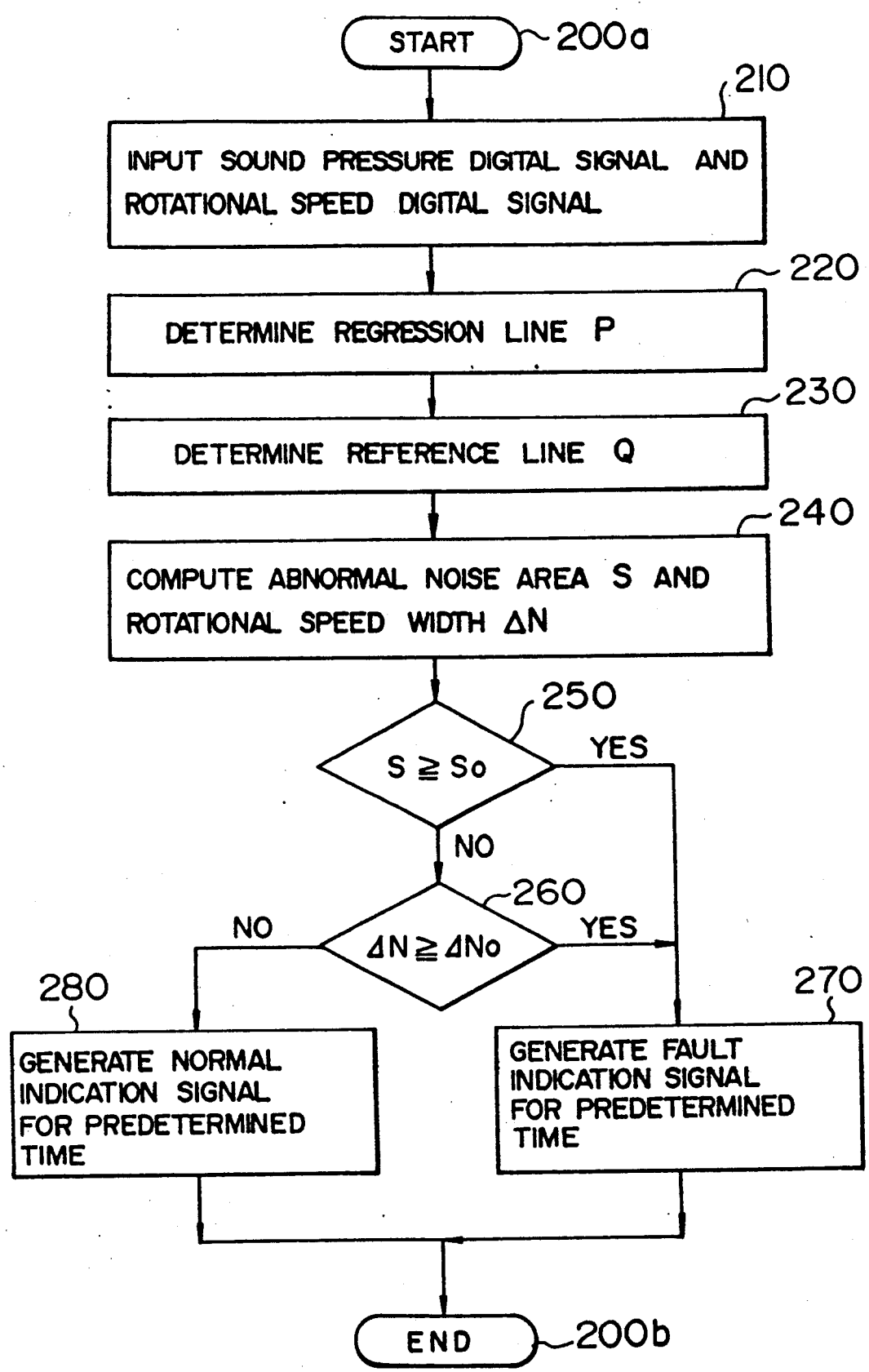
FIG. 2 is a flowchart showing the operation of the microcomputer in FIG. 1.

An amplifier 80 amplifies a rotational speed signal from the rotational speed sensor 20 and generates an amplification signal. An F/V converter 90 is for converting the frequency of an amplification signal from the amplifier 80 into a voltage proportional thereto, and generates a rotational speed voltage signal. An A/D converter 100 is for converting a rotational speed voltage signal from the F/V converter 90 into a digital value and generates a digital rotation speed signal. A microcomputer 110 executes a computer program on the basis of an output from the A/D converters 70 and 100 in accordance with a flowchart shown in FIG. 2, and during the execution of the program, processes a computation necessary for controlling the drive circuit 120 connected to an indication lamp 130. The computer program is stored in advance in the ROM of the microcomputer 110.

In the embodiment configured as above, for the purpose of conducting a fault inspection of an alternator G, the alternator G is driven by the drive unit D in such a manner that the rotational speed N thereof changes linearly with the passage of time t as shown in FIG. 3. If the apparatus according to the present invention is energized under this condition, the rotational sound generated from the alternator G is produced from the microphone 10 as a rotational sound signal, and at the same time, the rotational speed N of the alternator G is generated by the rotational speed sensor 20 as a rotational speed signal.

The amplifier 30 then amplifies and generates a rotational sound signal from the microphone 10 as an amplification signal, and the filter 40 extracts and generates as a filter signal the frequency component corresponding to an abnormal rotational sound of the alternator G from the amplification signal. The effective value conversion circuit 50 converts the filter signal into an effective value signal, and the logarithm conversion circuit 60 logarithmically converts the level of the effective value signal into a sound pressure Ls, which is generated as a sound pressure signal. The A/D converter 70 converts the sound pressure signal into a digital sound pressure signal. Also, the amplifier 80 amplifies and generates as an amplification signal the rotational speed signal from the rotational speed sensor 20. The F/V converter 90 converts the amplification signal from the amplifier 80 into a rotational speed voltage signal, and the A/D converter 100 converts the rotational speed voltage signal into a digital rotational speed signal.

Figure 4:
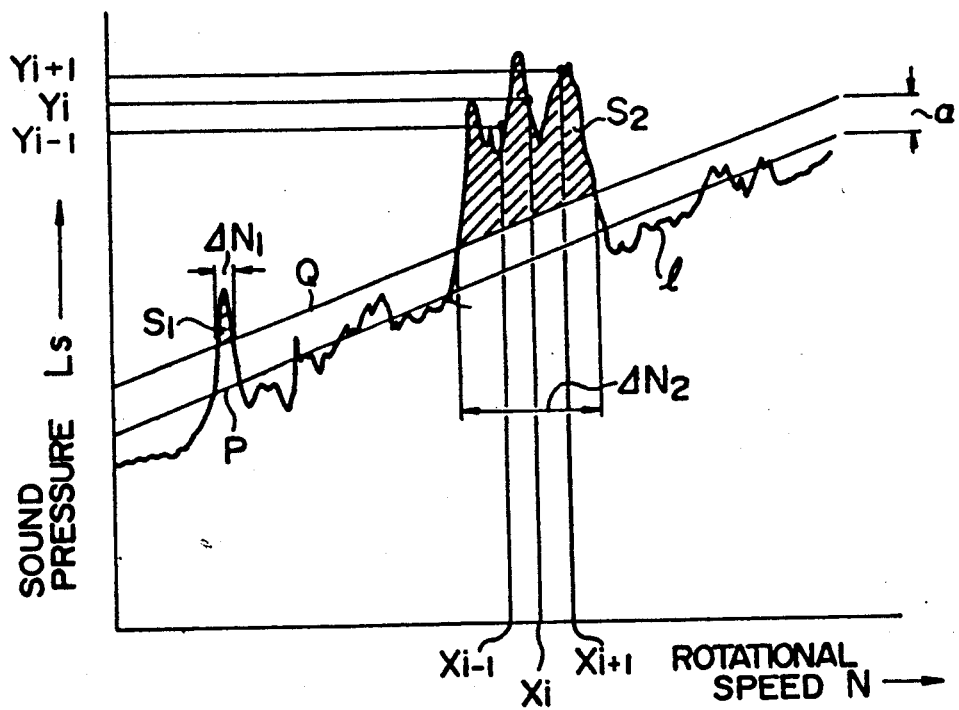
FIG. 4 is a diagram for explaining the preparation of a regression line and a reference line.

In the process of operation mentioned above, assume that the sound pressure Ls corresponding to an abnormal rotational sound generated from the alternator G undergoes a change with the rotational speed N along a curve 1 in FIG. 4 in accordance with the linear increase in the rotational speed N with passage of time t as shown in FIG. 3. With the energization of the apparatus according to the present invention, the microcomputer 110 starts execution of the computer program at step 200a in accordance with the flowchart of FIG. 2, and receives a digital sound pressure signal from the A/D converter 70 and a digital rotational speed signal from the A/D converter 100 with the passage of time t. In the meantime, the rotational speed N is stored temporarily in the microcomputer 110 in such a manner as to increase linearly with the passage of time t, and the sound pressure Ls is also stored temporarily in the microcomputer 110 in such a manner as to be specified by the curve 1 in accordance with the linear increase in the rotational speed N.

After the computation process at step 210, the microcomputer 110 prepares a regression line P at step 220 in the manner mentioned below.

Assume that, in FIG. 4, the sound pressure Ls is represented by the ordinate and the rotational speed by the abscissa, with a regression line P plotted as $Y=aX+b$. As shown, for a given point (Xi, Yi) on the curve 1, the relations hold as below.

$$\overline{X} = \frac{\sum_{i=1}^{n} Xi}{n} \quad (1)$$

$$\overline{Y} = \frac{\sum_{i=1}^{n} Yi}{n} \quad (2)$$

$$S(XX) = \Sigma Xi^2 - n(\overline{X})^2 \quad (3)$$
$$S(YY) = \Sigma Yi^2 - n(\overline{Y})^2 \quad (4)$$
$$S(XY) = \Sigma XiYi - n\overline{X}\overline{Y} \quad (5)$$

$$a = \frac{S(XY)}{S(XX)} \quad (6)$$

$$b = \overline{Y} - a\overline{X} \quad (7)$$

Take a number n of points (Xi, Yi) on the line 1, and calculate $\overline{X}$ and $\overline{Y}$ from equations (1) and (2) while processing equations (3) to (7). A regression line P is obtained as shown in FIG. 4.

After that, the computer 110 shifts the regression line P upward by α dB (such as 2 dB) in FIG. 4 in order to improve the signal-to-noise ratio at step 230 thereby to determine a reference line Q. In this case, the parts shadowed in FIG. 4 represent a region associated with the sound pressure Ls corresponding to an abnormal rotational sound generated from the alternator G. When the computer program proceeds to step 240, the microcomputer 110 computes each of the shadowed parts with the abnormal noise area as $S=S_1$ or $S=S_2$, while at the same time computing the width of each rotational speed $\Delta N_1$ or $\Delta N_2$ in which each shadowed part is defined by the reference line Q. Specifically, the equations (8) and (9) below $$\Delta Y_i = Y_i - (aX_{i+b}) \quad (8)$$

$$\Delta X_i = X_{i+1} - X_i \quad (9)$$

and equations (6) and (7) are used to compute
$$S = \Sigma \Delta X_i \cdot \Delta Y_i \quad (10)$$

$$\Delta N = \Sigma \Delta X_i \quad (11)$$

from $\Delta Yi$ and $\Delta Xi$ with $\Delta Yi$ larger than zero. Thus the conditions $S=S_1$ or $S_2$, and $\Delta N=\Delta N_1$ or $\Delta N_2$ are satisfied. The equations (1) to (11) are stored in the ROM of the microcomputer beforehand. In the range of rotational speeds other than $\Delta N_1$ and $\Delta N_2$, step 240 computes $\Delta N$ as zero and S as zero.

After the areas S of abnormal noise and the rotational speed width $\Delta N$ are computed in relationship with the reference line Q with the increase in the rotational speed N of the alternator G in the manner mentioned below, if the conditions $S=S_1<S_0$ and $S=S_1<S_0$ are satisfied at step 240, then the microcomputer 110 decides the answer at step 250 is "No". If $\Delta N=\Delta N_1<\Delta N_0$ but $\Delta N=\Delta N_2>\Delta N_0$ at the same time at step 240, on the other hand, the microcomputer 110 decides that the answer at step 260 is "yes", followed by step 270 to generate a fault indication signal as long as necessary for flashing of the indication lamp 130 warning that the abnormal noise from the alternator G exceeds a tolerance. If $S=S_2$ is higher than $S_0$ at step 240, by contrast, the microcomputer 110 decides that the answer at step 250 is "Yes", and generates a fault indication signal for a predetermined length of time at step 270. Upon generation of a fault indication signal at step 270 as mentioned above, the drive circuit 120 flashes the indication lamp 130 for a predetermined length of time. The symbol $S_0$ at step 250 represents the tolerable area (hereinafter called tolerable fault area $S_0$) of an abnormal noise generated in the alternator G, while the symbol $\Delta N_0$ at step 260 indicates a tolerable width of the rotational speed width $\Delta N$ (hereinafter called the tolerable rotational speed width $\Delta N_0$) defining the abnormal noise area $\Delta S$. $S_0$ and $\Delta N_0$ are stored in the ROM of the microcomputer 110 in advance. If the computation results at step 240 satisfies the conditions $S_1<S_0$, $S_2>S_0$, $\Delta N_1<\Delta N_0$ and $\Delta N_2<\Delta N_0$, then the microcomputer 110 decides that the answers are "No" at steps 250 and 260, followed by step 280 generating a no-fault indication signal as long as necessary for continuous lighting of the indication lamp 130 indicating that no abnormal noise is generated from the alternator G. In response to this, the drive circuit 120 turns on the indication lamp 130 continuously for a predetermined length of time.

As explained above, the decision is "Yes" at step 250 or 260 based on the computation results at steps 220 to 240 for the alternator G, the indication lamp 130 is flashed for a predetermined length of time, thereby making it possible to recognize that an abnormal noise is generated in the alternator G. In the case where decisions at both steps 250 and 260 are "No", on the other hand, the indication lamp 130 is continuously lit for a predetermined length of time, and therefore the alternator G not generating any abnormal noise is recognizable. In such a case, generation of an abnormal noise of the alternator G is decided in response to the establishment of at least one of the formulae $S \geq S_0$ and $\Delta N \geq N_0$ in the relationship between the shape of the curve l (See FIG. 4) and the reference line Q, thereby securing an improved inspection accuracy. Further, measurement taken after continuous changes in rotational speed shortens the inspection time.

Figure 5:
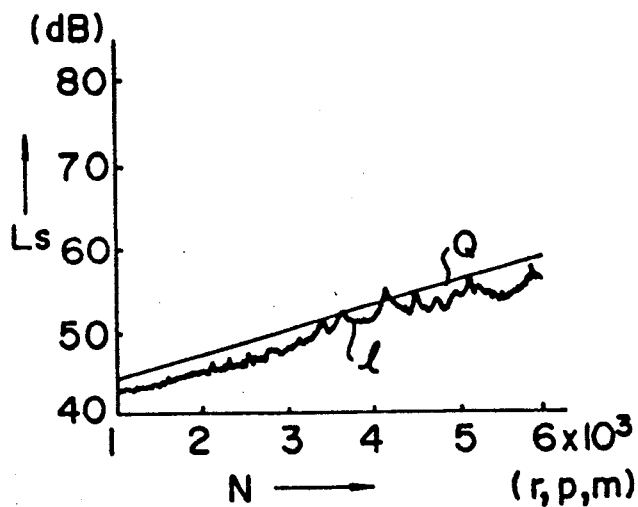
FIGS. 5 and 6 are diagrams for explaining the result of inspection of another alternator.
Figure 6:
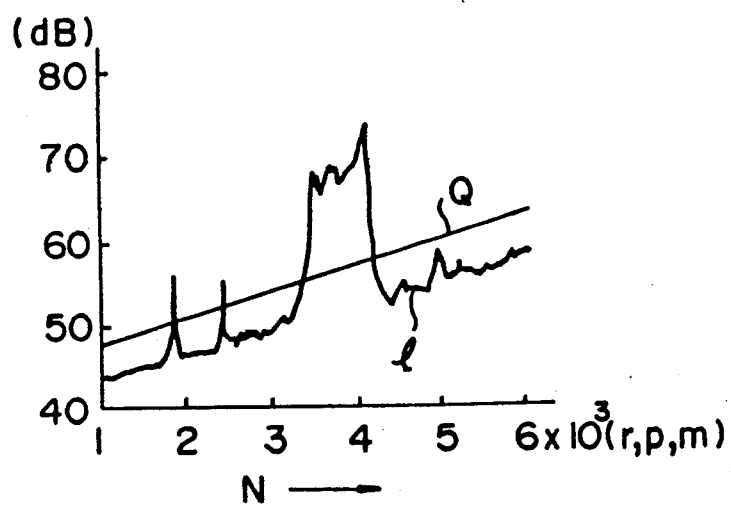

An inspection conducted of another two alternators other than alternator G by an apparatus according to the present invention shows that one of the two alternators was free of abnormal noise as shown in FIG. 5, and that the remaining alternator was substandard as far as an abnormal noise is concerned as shown in FIG. 6.

In embodying the present invention, the sum $S1+S_2$ of S and the sum $\Delta N_1+\Delta N_2$ of $\Delta N$ at step 240 may be used to make decision by comparison of $S_0$ and $\Delta N_0$ respectively at steps 250 and 260.

In the aforementioned embodiment, as shown in FIG. 5, experiments have confirmed that the sound pressure level Ls increases substantially linearly with the increase in the rotational speed of a generator, and therefore a reference line is prepared on the basis of a regression line. If the sound pressure level increases not linearly but along a quadratic curve, for example, depending on the rotary machine involved, it is necessary to prepare a reference line in accordance with the quadratic curve.

Further, in the case where the rotational speed of the alternator G increases linearly as shown in FIG. 3 or decreases linearly in embodying the invention, the decision at step 260 may be based on the rotational time instead of the rotational speed N of the alternator G with substantially the same effect as the above-mentioned embodiment. Also, if the linear change in the rotational speed as shown in FIG. 3 is impossible, the sound pressure Ls may be sampled at predetermined fixed intervals of rotational speed based on a detected rotational speed for achieving substantially the same effect in the above-mentioned embodiments.

A second embodiment of the present invention will be explained below.

Figure 7:
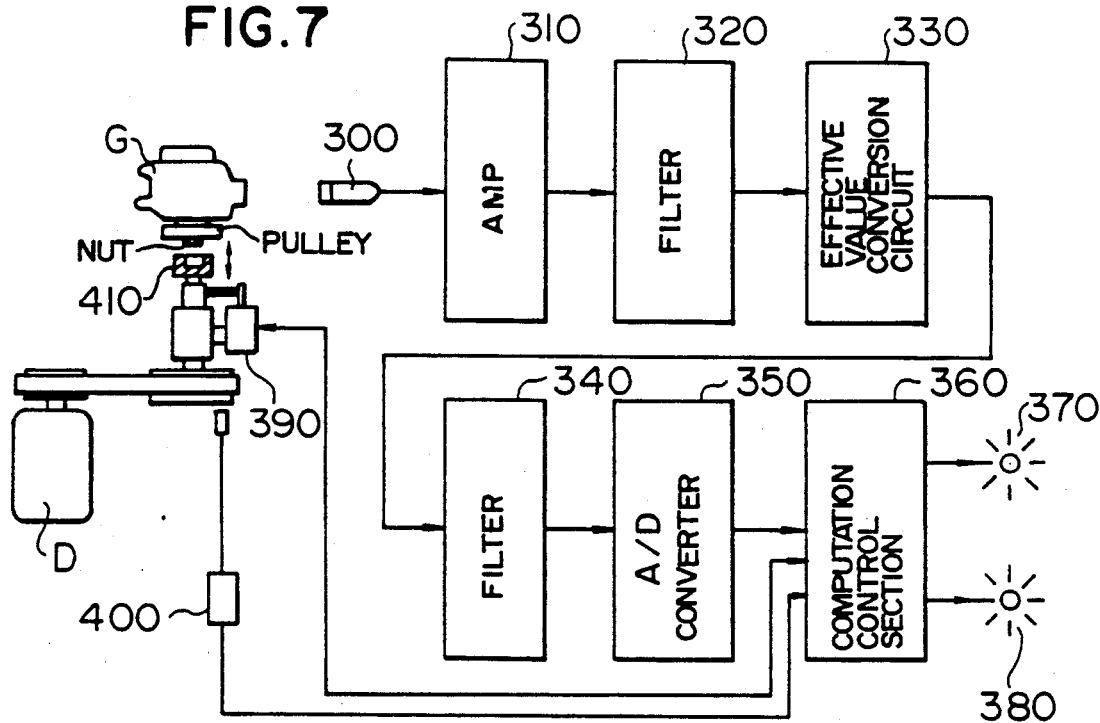
FIG. 7 is a block diagram showing a second embodiment of an apparatus according to the present invention.

In FIG. 7, character G designates a rotary machine to be inspected (such as an automotive generator), character D a motor for generating a turning effort to be applied to the product, and numeral 410 a coupling for transmitting the turning effort of the motor D to the product. This coupling is adapted to transmit the turning effort of the motor D to the rotary machine G by engagement with a nut fixing the pulley of the generator G. Numeral 390 designates a cylinder for placing the coupling 410 in engagement or disengagement with the nut of the generator G in response to a signal from a computation control section 360. The shaft of the coupling 410 and the motor D transmits the turning effort by way of a pulley and a belt. Further, the shaft of the coupling 410 is constructed movably by spline.

Numeral 300 designates a microphone including a pre-amplifier for converting the sound into an electrical signal, numeral 310 an amplifier for amplifying an electrical signal into which the sound is converted, and numeral 320 a band pass filter with the bandwidth of 10 kHz to 15 kHz for extracting only the frequency component of an abnormal noise (one between the slip ring and brush of the generator). Numeral 330 designates an effective value conversion circuit for determining an effective value of the frequency component extracted from filter circuit 320 and generates such an effective value as a sound pressure signal. Numeral 340 designates a high-pass filter for picking up only the change in sound pressure signal as a sound pressure change signal. Numeral 350 designates an A/D converter for converting sound pressure change signal from analog to digital signals. The computation control section designated by 360 computes the features of an abnormal noise from the waveform of a sound pressure change signal and make a decision with outputs produced indicating a fault or no-fault.

Numeral 400 designates a tachometer for detecting the rotational speed of the product involved, and the rotational speed detected is applied to the computation control section 360.

Figure 8:
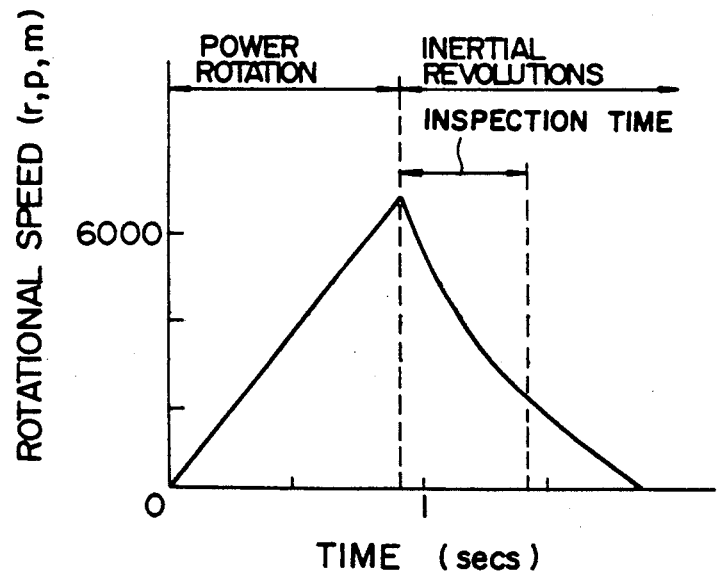
FIG. 8 is a characteristic diagram of the rotational speed of a rotary machine with time.

According to this embodiment configured as explained above, the turning effort of the motor D is transmitted through the coupling 410 to the generator G for an abnormal noise inspection of the generator G. First, as shown in FIG. 8, the rotational speed of the generator G is increased. Upon detection of a predetermined rotational speed (6000 r.p.m. in the present embodiment) by the computation control section 360 with the tachometer 400, the cylinder 360 is supplied with a signal to separate the coupling 410 with the generator G. As a result, the generator G continues to rotate due to its inertia, but comes to a stop after the inertia of its revolutions is lost.

During the inertial revolutions due to its inertia or revolutions of the generator, the generator is maintained under no-load to prevent any magnetic noise which otherwise might be caused by a load current. As a consequence, inspection is conducted free of the effects of the noise of engagement between the product nut and the coupling for transmission of the turning effort and the magnetic noise which otherwise might be generated from the product hampering the detection of an abnormal noise during the inertial revolutions.

An abnormal noise is detected by the microphone 300 for 0.4 seconds following the start of inertial revolutions. The period of 0.4 seconds is a sufficiently short time to prevent the stoppage of revolutions of the product according to the present embodiment. (The rotational speed of 2000 r.p.m. or more is maintained even after 0.4 seconds.)

The noise is converted into an electrical signal by the microphone 300 and the pre-amplifier, and amplified by the amplifier 310. An extraneous frequency component is removed by the bandpass filter circuit 320, and the signal is converted into an effective value by the effective value conversion circuit 330 in the form of a sound pressure signal representing a sound level. From this signal, the features of the sound caused by a flaw rapidly changing in synchronism with revolutions are produced as a sound pressure change signal by the high-pass filter circuit 340 except for the slow reduction in sound pressure with the decrease in rotational speed during inertial revolutions. This sound pressure change signal is converted from analog to digital signals at the A/D converter 350, and is applied to the computation control section 360. As a result, the computation control section 360 is supplied with a waveform of sound pressure change signal as shown in the example of decision in FIG. 10.

The computation control section 360, supplied with a waveform of sound pressure change signal from the A/D converter 350 at step 510, counts the number of peaks exceeding a set value ($1.5 \times 10^{-3}$ Pa in the present embodiment) at step 520.

Figure 11:
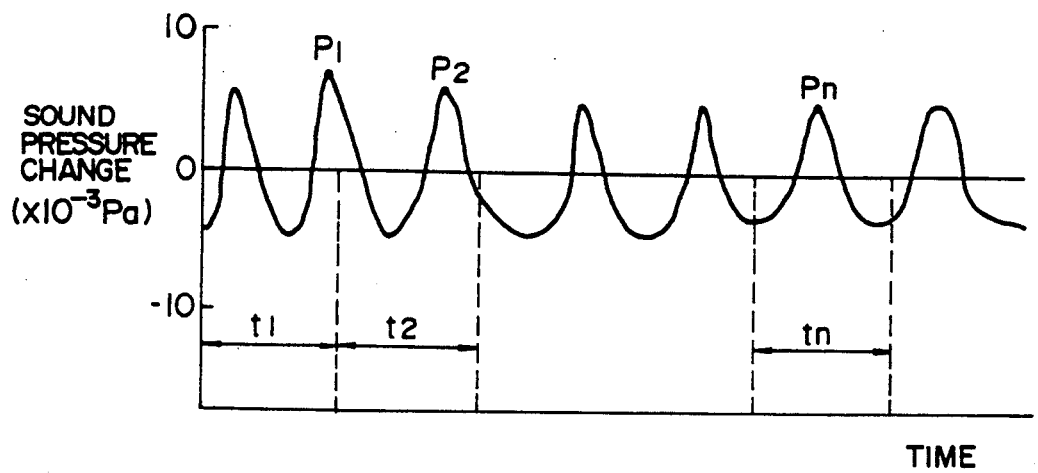
FIG. 11 is a diagram for explaining the detection of an average peak value of sound pressure changes.

At the same time, step 530 determines an average of the peak values of the signal waveform mentioned above. A method of determining an average of peak values is by dividing the waveform of sound pressure change signal equally by the lengths of time $t_1, t_2, \ldots, t_n$ which never fail to include one revolution of the generator G as shown in FIG. 11. Then, the maximum value $P_i$ at each section $t_i$ is determined. The average of peak values is thus determined as $$\sum_{i=1}^{n} P_i/n.$$

Step 540 compares the number of peaks determined at step 520 with a standard value ①, and if the number of peaks is larger than the standard value ①, the process proceeds to step 550 for comparing the average of peak values with a standard value ②. If the average of peak values is larger than the standard value ②, step 560 turns on a lamp 370 or the like indicating a fault.

Figure 10A:
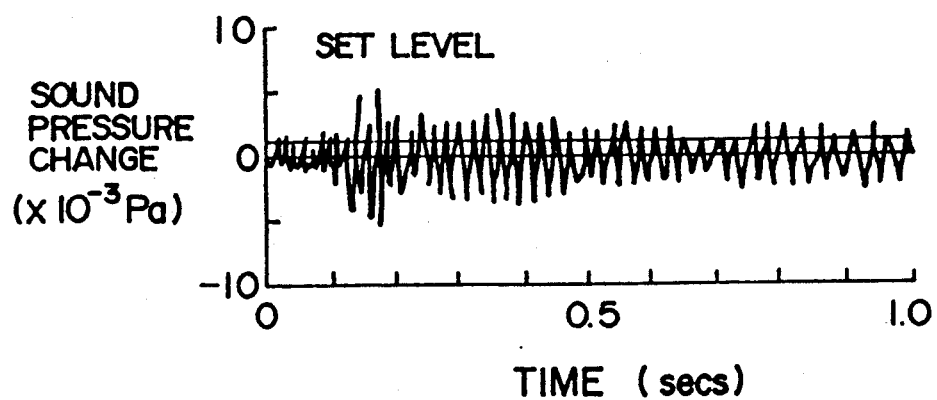
FIGS. 10(a) and 10(b) are characteristics diagrams showing an actual example of sound pressure changes with time.

Specifically, in FIG. 10(a) where the number of peaks is 22 with an average peak value of $2.01 \times 10^{-3}$ (Pa), a fault is decided.

If steps 540 and 550 determine that the number of the peaks is smaller than the standard value ① or the average of the peak values is smaller than the standard value ②, step 570 turns on the lamp 380 or the like indicating no fault.

Figure 10B:
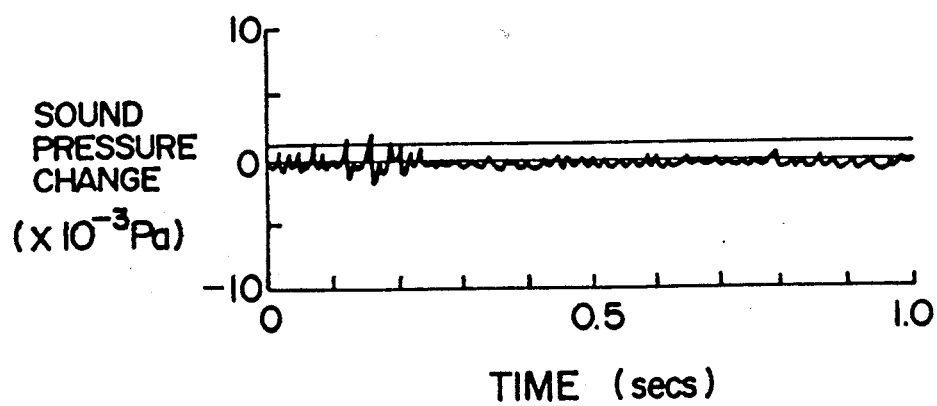

In FIG. 10(b) with three peaks and an average peak value of $0.35 \times 10^{-3}$ (Pa), by contrast, no fault is decided.

The reason why the number of peaks is counted at step 520 and compared with the standard value ① at step 540 is in order to prevent a decision error due to an unexpected external noise including the equipment sound by grasping the features of an abnormal noise generated for each revolution. Specifically, the number of peaks is counted and it is decided whether the count is more than the number commensurate with the number of revolutions thereby to eliminate the effect of the noise.

The reason why peak values are averaged at step 530 and the average is compared with the standard value ② at step 550 is in order to remove the effect of fluctuations of peak values due to an abnormal noise for each revolution to assure a stable decision. Also, the averaging process advantageously removes the effect of a single very large peak which may occur.

It is thus possible to detect an abnormal noise which may be generated between the brush and slipring.

Unlike in detecting a flaw between brush and slipring which is indicated as a corresponding sound pressure change, the sound pressure change for detecting a fine flaw over the entire periphery of a bearing is not accompanied by any conspicuous feature. In such a case, it has been found that the area S of sound pressure level shown in FIG. 13 may be used for inspection. This area has a meaning similar to the average value of sound pressure levels for 0.4 seconds from the start of inertial revolutions.

Accordingly, in a third embodiment, as shown in FIG. 1, a logarithm conversion circuit 640 is used in place of the high-pass filter circuit 340 of the second embodiment to convert the effective value of the sound pressure obtained from the effective value conversion circuit 630 into a decibel (dB) indication. Also, the filter circuit 620 has a bandwidth of 5 kHz to 9 kHz for detecting an abnormal noise of the bearing.

Figure 12:
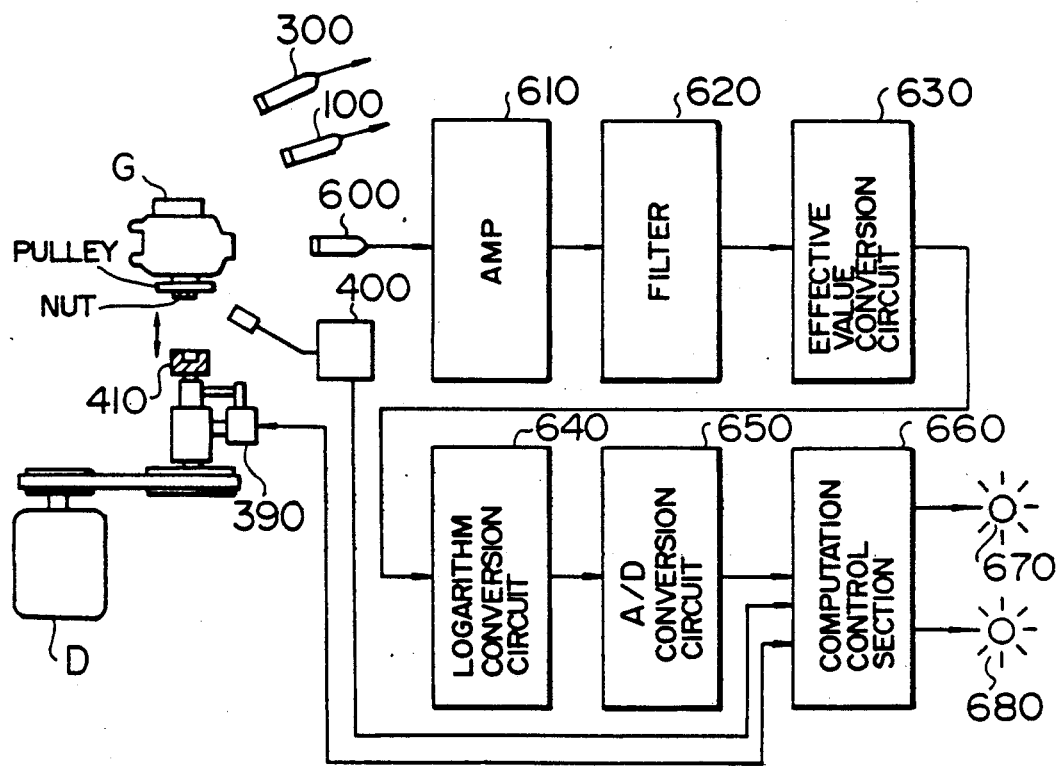
FIG. 12 is a block diagram showing a third embodiment of an apparatus according to the present invention.
Figure 14:
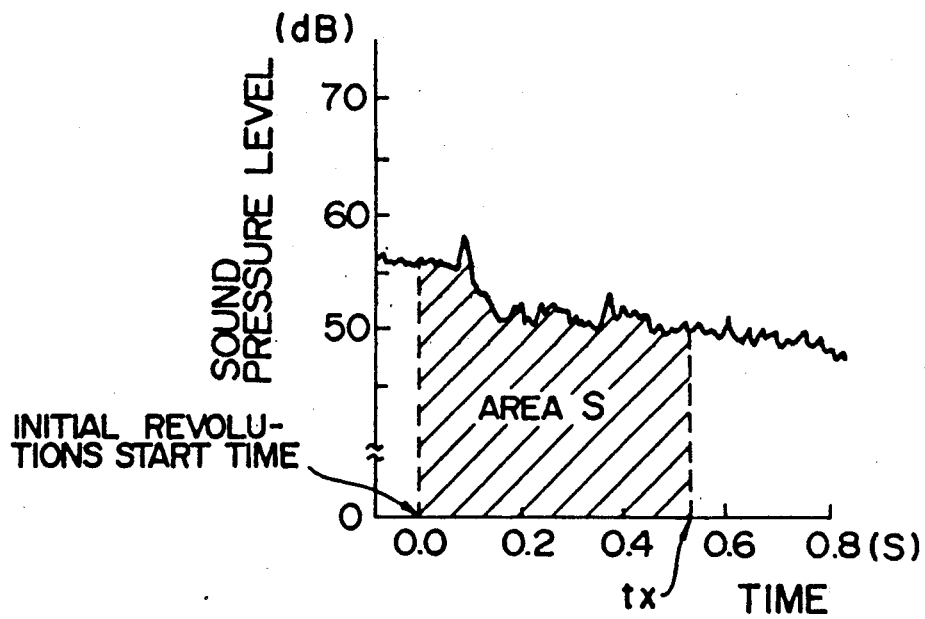

The area S used for inspection is affected by the variations in the time of inertial revolutions. To obviate this inconvenience, as shown in FIG. 12, the rotational speed is detected from the very product involved, and as shown in FIG. 14, the area is normalized by the time before reaching a predetermined rotational speed (say, 2000 r.p.m.). In this way, the effect of variations in rotational time is eliminated for satisfactory and accurate inspection.

Specifically, the area S is normalized by the formula shown below.

$$S_1 = \frac{t_n}{t_x} \times S$$

($t_n$: Reference time of, say, 0.4 seconds)

Figure 13:
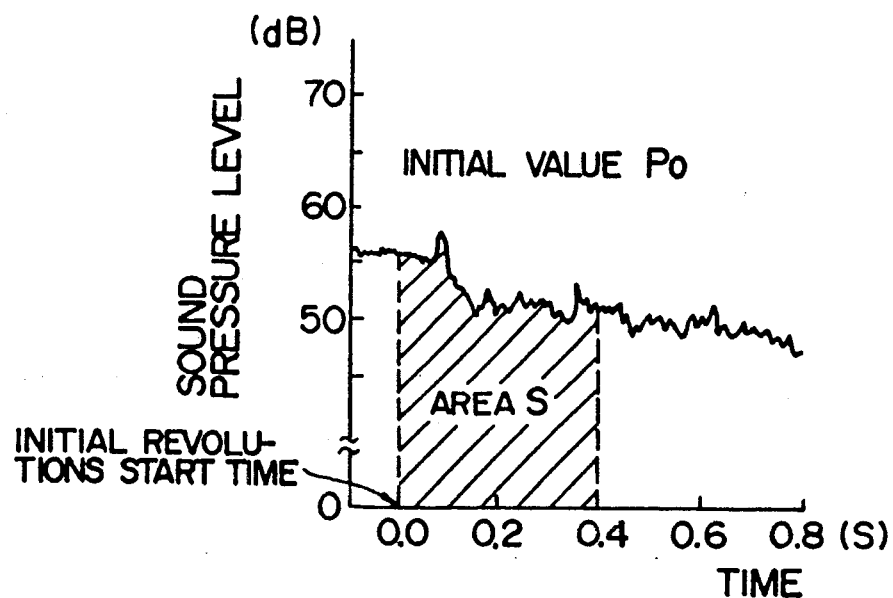
FIGS. 13 and 14 are diagrams for explaining the result of inspection of an alternator.

In the case where the sound pressure level during inertial revolutions may be represented by a single point, the sound pressure level at a single point such as the initial value may be used for inspection as shown in FIG. 13.

The aforementioned first to third embodiments may be provided with a plurality of microphones 10, 300 and 600 and other control circuits as shown in FIG. 12 so that all types of abnormal noises (including chatter, noise between brush and slipring and bearing noise) may be measured at a time while changing the rotational speed of the rotary machine shown in FIG. 8.

In the event that a fault of the product involved takes a definite form of sound, on the other hand, an abnormal noise is preferably detected by microphone. In the case where the sound detection is difficult due to a large effect of background noise or a product fault is clearly represented by a vibration, however, a vibration sensor is a choice for detection of abnormal vibrations.

Further, the sound and vibrations may be combined for inspection.

Furthermore, applications of the present invention ar not confined to the alternator G but of course to fault inspection of various rotary machines including generators and motors.

We claim:

1. A fault inspection system for rotary machines, comprising:
   first detection means for detecting as a first detection signal a selected one of the rotational speed and a physical quantity related thereto of a rotary machine driven in such a manner as to change the rotational speed thereof;
   second detection means for detecting as a second detection signal a selected one of the sound pressure and mechanical vibrations generated from the rotary machine as it is driven;
   first determining means for determining a reference line representing a relationship with the passage of time between values of the first and second detection signals;
   second determining means for determining a third detection signal related to the area corresponding to a region where the instantaneous value of the second detection signal exceeds the reference line; and
   decision means for determining that the rotary machine is faulty when the third detection signal is not within a predetermined value.

2. An inspection system according to claim 1, wherein said reference line includes a regression line representing the relationship between the values of the first and second detection signals in accordance with the change in said first and second detection signals.

3. An inspection system according to claim 2, wherein said reference line includes a second regression line which is parallel to said regression line but has a higher value than said regression line by a predetermined value.

4. An inspection system according to claim 3, wherein said third detection signal represents an area S corresponding to the region where the second detection signal exceeds said second regression line.

5. An inspection system according to claim 3, wherein said third detection signal represents a distance by which the value of said second detection signal exceeds said second regression line.

6. A fault inspection system for a rotary machine, comprising:
   drive means for increasing the rotational speed of a rotary machine gradually and after reaching a predetermined rotational speed allowing the rotary machine to rotate due top its inertia;
   first detection means for detecting as a first detection signal a selected one of the rotational speed and a physical quantity related thereto of said rotary machine;
   second detection means for detecting as a second detection signal a selected one of the sound pressure and mechanical vibration generated from the rotary machine before reaching a predetermined rotational speed after being increased in rotational speed gradually;
   first determining means for determining a reference line representing a relationship with the passage of time between the values of the first and second detection signals;
   second determining means for determining an area corresponding to the region where the instantaneous value of the second detection signal exceeds the reference line, said second determining means also determining the amount of change in the value of the first detection signal defined by said area and said reference line;
   first decision means for deciding that the rotary machine is faulty when a selected ne of said area and an amount by which the instantaneous value exceeds the reference line is not within a tolerable limit;
   third detection means for detecting at least one of the sound pressure and mechanical vibration generated from the rotary machine in said rotations due to inertia; and
   second decision means for determining that the rotary machine is faulty when the third detection signal produced from said third detection means is different from a normal value.

7. An inspection system according to claim 6, wherein said second decision means includes peak number detection means for detecting the number of peaks exceeding the reference line of signals detected by said detection means and peak value average detection means for detecting an average value of peaks exceeding the reference line, said inspection system deciding that the rotary machine is faulty when the number of peaks detected by the peak number detection means is not within a predetermined number and when the average value of peaks produced from said peak value average detection means is not within a predetermined value.

8. An inspection system according to claim 6, wherein said second decision means includes area detection means for detecting an area corresponding to the region where the value of signals detected by said second detection means exceeds a second reference line during a predetermined length of time when the rotary machine is in said rotations due to inertia, said second decision means indicating that the rotary machine is faulty when said area is not within a predetermined tolerable limit.

* * * * *